UNITED STATES PATENT OFFICE.

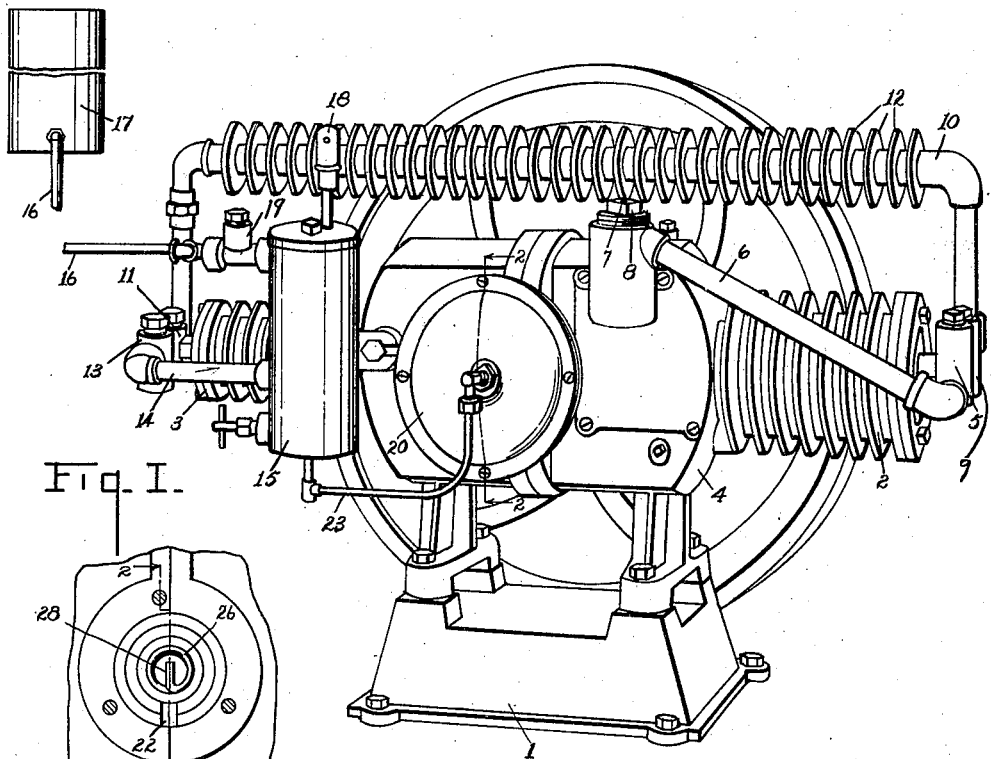
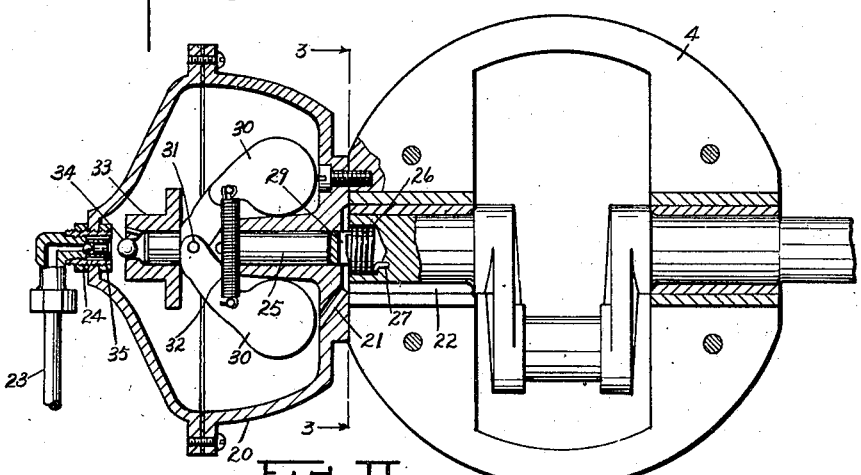

HARLEY M. DUNLAP, OF BATTLE CREEK, MICHIGAN.

PUMP.

1,390,513.  Specification of Letters Patent.  Patented Sept. 13, 1921.

Application filed May 27, 1918. Serial No. 236,727.

*To all whom it may concern:*

Be it known that I, HARLEY M. DUNLAP, a citizen of the United States, residing at Battle Creek, county of Calhoun, State of Michigan, have invented certain new and useful Improvements in Pumps, of which the following is a specification.

This invention relates to improvements in pumps.

The main objects of this invention are:

First, to provide in a pressure pump a means for unloading the same.

Second, to provide in a pump an improved means for trapping the oil and returning it to the crank case.

Third, to provide an improved pump having these advantages which is entirely automatic and at the same time efficient for the purpose intended.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Figure I is a perspective view of a pump embodying the features of my invention, the storage tank being shown conventionally, as are also certain parts of the pump and connections.

Fig. II is a detail transverse section on a line corresponding to line 2—2 of Figs. I and III.

Fig. III is an enlarged detail section on a line corresponding to line 3—3 of Fig. II.

In the drawing similar reference characters refer to similar parts throughout the several views, and the sectional views are taken looking in the direction of the little arrows at the ends of the section lines.

Referring to the drawing, the base 1 may be of any suitable design. The low pressure cylinder 2 and the high pressure cylinder 3 are disposed in alinement on opposite sides of the crank case 4. The details of the pump are not shown as they form no part of this invention.

In the structure illustrated the inlet valve 5 of the low pressure cylinder is connected to the crank case through the pipe 6, the air entering the crank case through the breather opening 7 in the plug 8. The discharge valve 9 of the cylinder 2 is connected by the pipe 10 to the inlet valve 11 of the high pressure cylinder 3. The pipe 10 is provided with cooling flanges 12.

The discharge valve 13 of the high pressure cylinder is connected by the pipe 14 to the oil trap 15. The oil trap is in turn connected by the pipe 16 to the storage tank 17. A relief or safety valve 18 is provided for the oil trap. The pipe 16 is provided with a check valve 19.

To unload the pump, that is, to relieve it of the pressure when the pump stops and further when desired to trap the oil and return it to the crank case, I provide an unloading connection from the oil trap 15 to the crank case comprising a housing 20 secured to the side of the crank case and communicating therewith through the passages 21 and 22. This housing is connected to the oil trap by the pipe 23. A valve, designated generally by the numeral 24, is provided in the connection for the pipe 23 to the housing. This valve is controlled by a governor means comprising a spindle 25 disposed in alinement with the crank shaft and connected to the end thereof by means of the spring 26, one end of which engages the crank shaft at 27 and the other turned laterally at 28 to engage a slot 29 in the end of the spindle, the purpose being to provide a yielding driving means which relieves the parts from shock.

On the spindle 25 I mount governor weights 30, the weights being pivoted at 31 and connected by the spring 32. The valve actuating member 33 is mounted on the end of the spindle and carries a ball 34 adapted to engage the seating member 35 of the valve 24, so that when the speed of the crank shaft exceeds a predetermined point the actuating member is forced outwardly by the governor weights to close the valve. This compels the air to be discharged through the check valve 19.

When the pump stops, the ball 34 is released and is opened by the pressure and the air discharged from the pump and its connections in advance of the check valve 19 into the crank case carrying with it any accumulated oil in the trap.

Where it is not desired to embody this feature of returning the oil to the crank case the unloader may discharge into the air or into a receptacle where the unloading connection is made to the oil trap. In starting, the pump runs free until its speed reaches the predetermined point when the unloading valve is automatically closed and the air discharged through the check valve.

I have illustrated my improved unloader device in the form in which I have embodied the same for the market, various features being shown, however, more or less conventionally. I have not attempted to illustrate or describe various modifications and adaptations which I contemplate or which might be desirable for certain uses as I believe the disclosure made will enable those skilled in the art to which this invention relates to embody or adapt the same as may be desired.

Having thus described my invention, what I claim as new and desire to secure by Letters Patent, is:

1. In a pump, the combination of a cylinder, a crank case, a crank, a storage tank, a delivery connection from said pump to said storage tank provided with a check valve, an oil trap disposed in said delivery connection in front of said check valve, a housing secured to the side of said crank case and communicating therewith, a connection from the lower end of said oil trap to said housing, an unloading valve for said connection, a governor means for controlling said unloading valve comprising a spindle having driving connection with said crank, governor weights mounted on said spindle, and a cap-like valve actuating member mounted on the end of said spindle to be actuated by said governor weights and carrying a ball adapted to engage said unloading valve to close the same when the speed of the crank shaft exceeds a predetermined point, all coacting for the purpose specified.

2. In a pump, the combination of a cylinder, a crank case, a crank, a storage tank, a delivery connection from said pump to said storage tank provided with a check valve, an oil trap disposed in said delivery connection in front of said check valve, a housing secured to the side of said crank case and communicating therewith, a connection from the lower end of said oil trap to said housing, an unloading valve for said connection, a governor means for controlling said unloading valve comprising a spindle having driving connection with said crank, governor weights mounted on said spindle, and a member actuated by said governor weights to close said unloading valve when the speed of the crank shaft exceeds a predetermined point, all coacting for the purpose specified.

3. In a pump, the combination of a cylinder, a crank case, a crank, a storage tank, a delivery connection from said pump to said storage tank provided with a check valve, an oil trap disposed in said delivery connection in front of said check valve, a housing secured to the side of said crank case and communicating therewith, a connection from the lower end of said oil trap to said housing, an unloading valve for said connection disposed in alinement with said crank shaft, a governor means for controlling said unloading valve comprising a spindle disposed in alinement with said crank shaft, and having a spring driving connection therewith, governor weights mounted on said spindle, and a member actuated by said governor weights to close said unloading valve when the speed of the crank shaft exceeds a predetermined point, all coacting for the purpose specified.

4. In a pump, the combination of a cylinder, a crank case, a crank, a delivery connection for said pump provided with a check valve, an oil trap disposed in said delivery connection in advance of said check valve, an unloading connection connecting said oil trap to said crank case, an unloading valve for said connection, a governor means for controlling said unloading valve comprising a spindle, governor weights mounted on said spindle, and a cap-like valve actuating member mounted on said spindle to be actuated by said governor weights and carrying a ball adapted to engage said unloading valve whereby the same is closed when the speed of the pump exceeds a predetermined point, all coacting for the purpose specified.

5. In a pump, the combination of a cylinder, a crank case, a crank, a delivery connection for said pump provided with a check valve, an oil trap disposed in said delivery connection in advance of said check valve, an unloading connection connecting said oil trap to said crank case, an unloading valve for said connection, a governor means for controlling said unloading valve comprising a spindle disposed in alinement with said crank shaft and having a spring driving connection therewith, governor weights mounted on said spindle, and a valve actuating member actuated by said governor weights to close said unloading valve when the speed of the pump exceeds a predetermined point, all coacting for the purpose specified.

6. The combination with a pressure pump, of a delivery connection therefor provided with a check valve, an oil trap disposed in said delivery connection in front of said check valve, an unloading valve connected to the lower end of said oil trap, a governor means for controlling said unloading valve comprising a spindle having driving connection with said pump, governor weights mounted on said spindle, and a cap-like valve actuating member mounted on the ends of said spindle to be actuated by said governor weights and carrying a ball adapted to engage said unloading valve to close the same when the speed of the pump exceeds a predetermined point.

7. The combination with a pressure pump, of a delivery connection therefor provided with a check valve, an oil trap disposed in said delivery connection in front of said check valve, an unloading valve connected to the lower end of said oil trap, a governor means for controlling said unloading valve comprising a spindle having driving connection with said pump, governor weights mounted on said spindle, and a member actuated by said governor weights to close said unloading valve when the speed of the pump exceeds a predetermined point.

8. In a pump, the combination of a cylinder, a crank, a delivery connection for said pump provided with a check valve, an oil trap disposed in said delivery connection in advance of said check valve, an unloading valve for said oil trap, a governor means for controlling said unloading valve comprising a spindle disposed in alinement with said crank shaft and having a spring driving connection therewith, governor weights mounted on said spindle, and a valve actuating member actuated by said governor weights to close said unloading valve when the speed of the pump exceeds a predetermined point, all coacting for the purpose specified.

9. The combination with a pressure pump, of a delivery connection therefor provided with a check valve, a liquid trap disposed in said delivery connection in advance of said check valve, an unloading valve for said liquid trap, and a governor means operatively associated with said pump adapted to open said unloading valve when the speed of the pump is below a predetermined point, thereby relieving the pump of its load and discharging the liquid from said trap.

10. The combination with a pressure pump, of a delivery connection for said pump provided with a check valve, a liquid trap disposed in said delivery connection in advance of said check valve, an unloading valve at the bottom of said liquid trap, and a governor means for controlling said unloading valve having driving connection with said pump, whereby when the speed of the pump falls below a predetermined rate, said unloading valve is opened to relieve the load and discharge the liquid from said liquid trap.

In witness whereof, I have hereunto set my hand and seal, in the presence of two witnesses.

HARLEY M. DUNLAP. [L. S.]

Witnesses:
   Roy M. Ludlum,
   Natalie Bernard.